US009684993B2

(12) United States Patent
Weitzberg

(10) Patent No.: US 9,684,993 B2
(45) Date of Patent: Jun. 20, 2017

(54) FLIGHT PATH CORRECTION IN VIRTUAL SCENES

(71) Applicant: LUCASFILM ENTERTAINMENT COMPANY, LTD., San Francisco, CA (US)

(72) Inventor: David Weitzberg, San Francisco, CA (US)

(73) Assignee: LUCASFILM ENTERTAINMENT COMPANY LTD., San Francisco, CA (US)

(*) Notice: Subject to any disclaimer, the term of this patent is extended or adjusted under 35 U.S.C. 154(b) by 0 days.

(21) Appl. No.: 14/862,512

(22) Filed: Sep. 23, 2015

(65) Prior Publication Data

US 2017/0084072 A1 Mar. 23, 2017

(51) Int. Cl.
*G06T 13/00* (2011.01)
*G06T 15/20* (2011.01)
*G06T 7/00* (2017.01)
*G06T 7/20* (2017.01)
*G06T 13/20* (2011.01)

(52) U.S. Cl.
CPC ............. *G06T 15/20* (2013.01); *G06T 7/004* (2013.01); *G06T 7/20* (2013.01); *G06T 13/20* (2013.01)

(58) Field of Classification Search
USPC .......................................... 345/474; 348/559
See application file for complete search history.

(56) References Cited

U.S. PATENT DOCUMENTS

| | | | | |
|---|---|---|---|---|
| 8,576,235 B1* | 11/2013 | Sumner | ................... | G06T 13/20 345/473 |
| 8,686,995 B2* | 4/2014 | Varadhan | ................ | G06T 19/00 345/419 |
| 8,861,840 B2* | 10/2014 | Bell | ........................ | G01S 17/89 345/582 |
| 8,861,841 B2* | 10/2014 | Bell | ........................ | G01S 17/89 345/419 |
| 8,879,828 B2* | 11/2014 | Bell | ........................ | G01S 17/89 345/420 |
| 2006/0132482 A1* | 6/2006 | Oh | ........................... | G06T 13/80 345/419 |
| 2007/0211149 A1* | 9/2007 | Burtnyk | ............... | G11B 27/034 348/208.4 |
| 2009/0259976 A1* | 10/2009 | Varadhan | ................ | G06T 15/20 715/850 |

(Continued)

*Primary Examiner* — Kimbinh T Nguyen
(74) *Attorney, Agent, or Firm* — Kilpatrick Townsend & Stockton LLP

(57) ABSTRACT

A method includes receiving a first motion path for an object, where an orientation of the object is not aligned with the first motion path for the object for at least a portion of the first motion path. The method also includes receiving a first motion path for a virtual camera and determining a speed of the object along the first motion path for the object. The method additionally includes calculating a second motion path for the object based on the speed of the object along the first motion path for the object and the orientation of the object, where the second motion path of the object is aligned with second motion path. The method further includes calculating a second motion path for the virtual camera based on a difference between the first motion path of the object and the second motion path of the object.

17 Claims, 9 Drawing Sheets

(56) References Cited

U.S. PATENT DOCUMENTS

| | | | |
|---|---|---|---|
| 2010/0259539 A1* | 10/2010 | Papanikolopoulos | G06K 9/00335 345/420 |
| 2012/0188452 A1* | 7/2012 | Keiser .................. | G06T 13/00 348/559 |
| 2014/0152699 A1* | 6/2014 | Oh ....................... | G06T 13/80 345/635 |
| 2016/0148413 A1* | 5/2016 | Oh ....................... | G06T 13/80 345/634 |

* cited by examiner

FLIGHT PATH CORRECTION IN VIRTUAL SCENES

BACKGROUND

In computer graphics, compositing includes combining visual effects from separate sources into single images to create the illusion that all of those elements are part of the same virtual scene. Generally, elements of a three-dimensional (3-D) virtual scene are processed by a renderer to produce a two-dimensional (2-D) representation of the scene. Objects in the 3-D virtual scene are represented by geometric and mathematical models that can be animated along a motion path. Animated objects moving through space can have their orientation altered relative to a virtual camera position in order to achieve a desired look.

BRIEF SUMMARY

In some embodiments, a method may include receiving a first motion path for an object in a virtual 3-D scene. In some embodiments, an orientation of the object may not be aligned with the first motion path for the object for at least a portion of the first motion path for the object. The method may also include receiving a first motion path for a virtual camera in the 3-D virtual scene and determining a speed of the object along the first motion path for the object. The method may additionally include calculating a second motion path for the object based on the speed of the object along the first motion path for the object and the orientation of the object. In some embodiments, the second motion path of the object may be aligned with second motion path. The method may further include calculating a difference between the first motion path of the object and the second motion path of the object and calculating a second motion path for the virtual camera based on the difference between the first motion path of the object and the second motion path of the object.

In some embodiments, a system may include one or more processors and one or more memory devices having instructions stored thereon that, when executed by the one or more processors, cause the one or more processors to perform operations including receiving a first motion path for an object in a virtual 3-D scene. In some embodiments, an orientation of the object might not be aligned with the first motion path for the object for at least a portion of the first motion path for the object. The operations may also include receiving a first motion path for a virtual camera in the 3-D virtual scene and determining a speed of the object along the first motion path for the object. The operations may additionally include calculating a second motion path for the object based on the speed of the object along the first motion path for the object and the orientation of the object. In some embodiments, the second motion path of the object may be aligned with second motion path. The operations may further include calculating a difference between the first motion path of the object and the second motion path of the object and calculating a second motion path for the virtual camera based on the difference between the first motion path of the object and the second motion path of the object.

In some embodiments, a non-transitory computer-readable medium may include instructions that, when executed by one or more processors, cause the one or more processors to perform operations including receiving a first motion path for an object in a virtual 3-D scene. In some embodiments, an orientation of the object might not be aligned with the first motion path for the object for at least a portion of the first motion path for the object. The operations may also include receiving a first motion path for a virtual camera in the 3-D virtual scene and determining a speed of the object along the first motion path for the object. The operations may additionally include calculating a second motion path for the object based on the speed of the object along the first motion path for the object and the orientation of the object. In some embodiments, the second motion path of the object may be aligned with second motion path. The operations may further include calculating a difference between the first motion path of the object and the second motion path of the object and calculating a second motion path for the virtual camera based on the difference between the first motion path of the object and the second motion path of the object.

One or more of the following features may be added to the above embodiments in any combination and without limitation. The virtual camera may be oriented towards the object as the virtual camera travels down the first motion path for the virtual camera, and the second motion path for the virtual camera may be calculated such that the virtual camera is oriented towards the object as the virtual camera travels down the second motion path for the virtual camera. The method/operations may also include receiving a visual effect for the object, where the visual effect is generated based on a motion direction of the object, and where the visual effect is visibly incorrect when the motion direction of the object is according to the first motion path for the object, and the visual effect is visibly correct when the motion direction of the object is according to the second motion path for the object. The first motion path may include a direction of motion for the object, and a speed of motion for the object. Determining the speed of the object along the first motion path for the object may include dividing virtual motion of the object according to the first motion path for the object into a sequence of time frames, and calculating a difference in position of the object in adjacent time frames. Determining the speed of the object along the first motion path for the object may include calculating an average of the differences in position of the object in each of the adjacent time frames. Determining the speed of the object along the first motion path for the object may include receiving a user-defined speed for the object. The virtual 3-D scene may include additional objects, and the method may further include changing the position of the additional objects based on the difference between the first motion path of the object and the second motion path of the object. The method/operations may also include rendering a series of images of the object moving along the second motion path for the object using the virtual camera moving along the second motion path of the virtual camera, and causing the series of images to be displayed in an animated sequence on a display device.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1A:
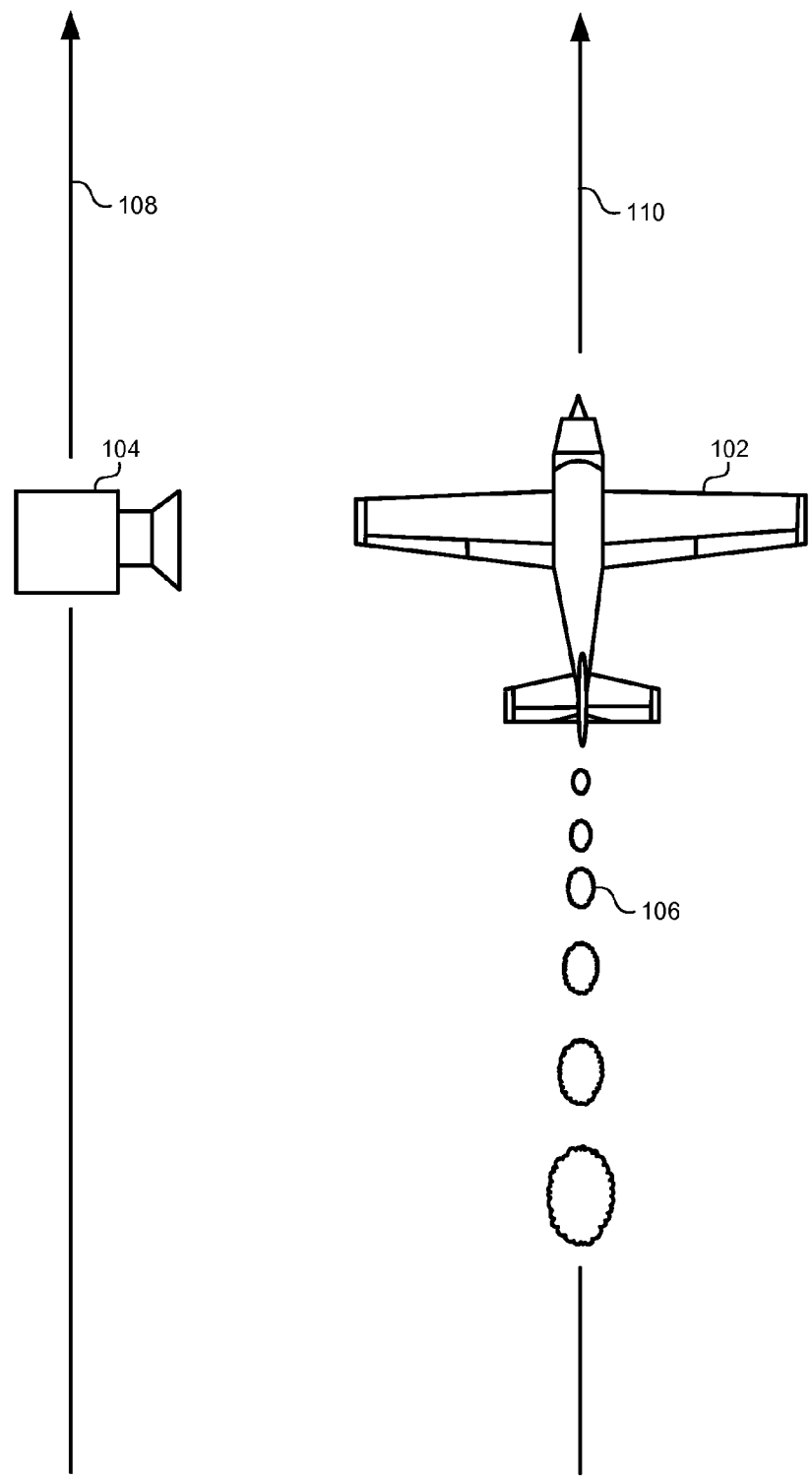
FIG. 1A illustrates an object traveling along a motion path relative to a virtual camera, according to some embodiments.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein are embodiments for correcting visual inconsistencies that occur when the orientation of an object is altered along a motion path. During the production of digital content featuring computer-generated scenes and/or characters, a virtual camera may be used in a 3-D virtual scene in order to capture 2-D rendered images. The 3-D virtual scene may exist primarily in software, with characters, vehicles, scenery, etc., represented by geometrical and mathematical models. As used herein, the term "object" will refer to any element of a 3-D virtual scene, such as human characters, vehicles, monsters, robots, rocks, scenery objects, and so forth. In an animated sequence, an object, such as a vehicle, may move from a first position to a second position within the 3-D virtual scene along a motion path. As used herein, the term "motion path" will broadly referred to any piecewise continuous path between a first position and a second position within a 3-D virtual scene.

Much like cameras in real-life motion pictures, virtual cameras will rarely remain stationary throughout a 3-D virtual scene. Instead, the virtual camera may move to continuously capture scenes and characters from varying angles. Therefore, the virtual camera may move along a motion path in a manner similar to how objects in the 3-D virtual scene move along motion paths. In some cases, the motion path of the virtual camera can be somewhat parallel to a motion path of an object in the 3-D virtual scene. For example, the virtual camera may follow along beside a character as the character walks through the room in the scene.

FIG. 1A illustrates an object 102 traveling along a motion path 110 relative to a virtual camera 104 traveling along its own motion path 108, according to some embodiments. In this example, the object 102 comprises an airplane. As the airplane travels along its motion path 110, the virtual camera 104 follows along next to the object 102 according to its own motion path 108. In this example, the motion path 108 of the virtual camera 104 is approximately parallel to the motion path 110 of the object 102. This parallel depiction is merely exemplary and not meant to be limiting. In actual 3-D virtual scenes, the motion path 108 of the virtual camera 104 may pan around the object 102, include velocities that differ from the object 102, deviate significantly from the depicted parallelism, and/or move closer to and farther away from the object 102. However, in order to describe embodiments of the present invention, the parallel motion paths of FIG. 1A will be used because of their simplicity.

Digital effects can be added to the motion of the object 102 in order to provide a more lifelike appearance. In this example, an effect 106 comprising a condensation trail, or "contrail," is generated behind the aircraft represented by the object 102. In real-life aircraft scenes, the engines of the aircraft will generate a familiar trail of water vapor and exhaust that is emitted behind the aircraft. Instead of generating geometric models for each of the thin artificial clouds that form the effect 106 in the 3-D virtual scene, mathematical equations and algorithms can be used to automatically generate the effect 106 based on the speed of the object 102 and the direction of the motion path 110. Existing algorithms for generating effects 106 such as the contrail generally do not depend on the orientation of the object 102, but instead focus primarily on the velocity and motion path 110.

Figure 1B:
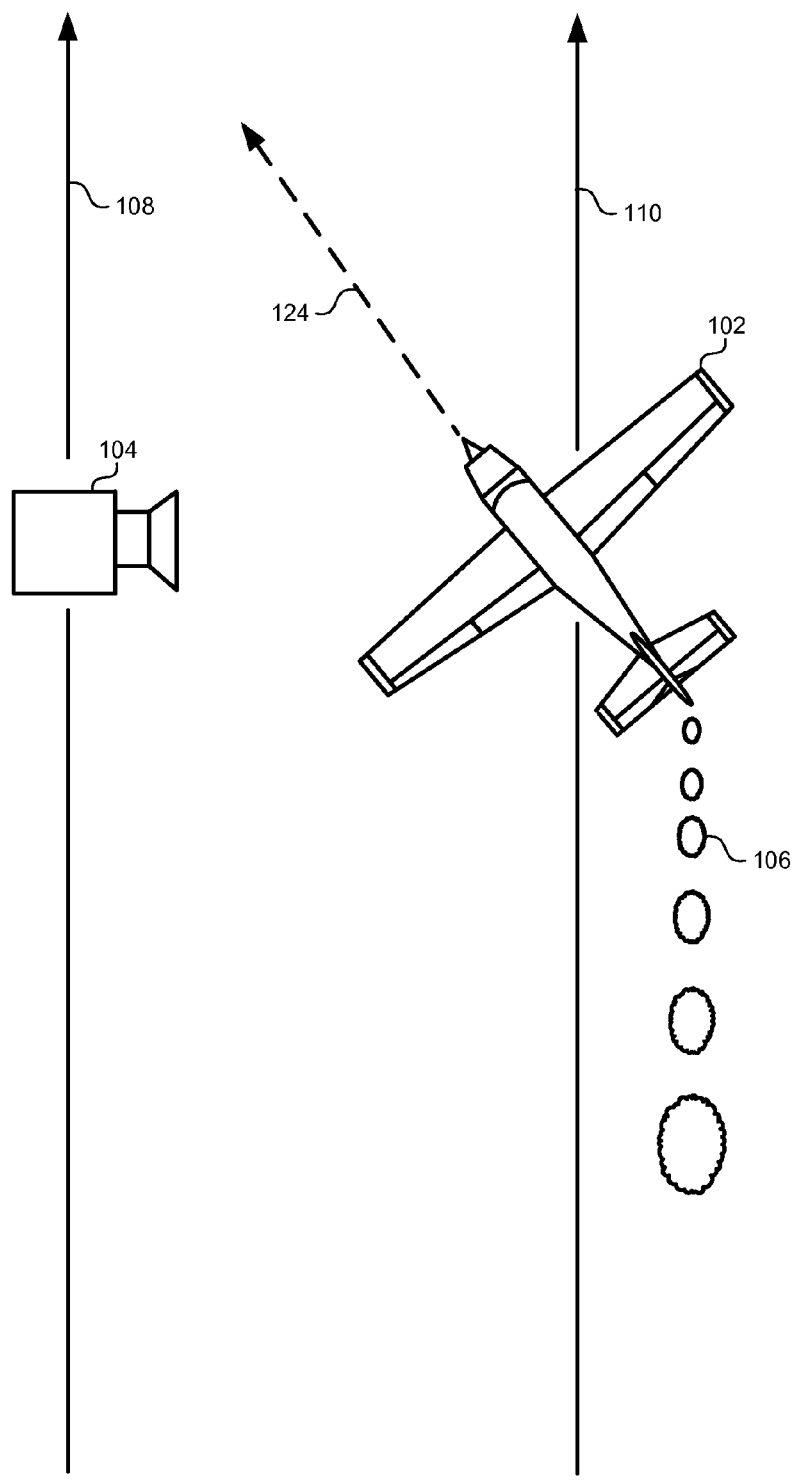
FIG. 1B illustrates the object traveling along the same motion path with a modified orientation in order to achieve a desired look, according to some embodiments.

FIG. 1B illustrates the object 102 traveling along the same motion path 110 with a modified orientation in order to achieve a desired look, according to some embodiments. One of the many advantages of filming a 3-D virtual scene as opposed to a real-life scene is the ability to generate camera angles and viewpoints that are physically impossible in the real world. The director of a 3-D virtual scene may want to adjust the orientation 124 of the object 102 towards or away from the virtual camera 104. By "cheating" the orientation 124 of the object 102, the motion path 108 of the virtual camera 104 and the motion path 102 of the object 102 can be maintained while capturing a more head-on view of the object 102.

The orientation 124 of the object can be defined as a direction which the object faces. In the example of FIG. 1B, the orientation of the aircraft is defined as the direction that the nose of the aircraft points. In humanoid character objects, the orientation may be defined as a direction perpendicular to the character's chest, or as a direction that a head of the humanoid character points. In some embodiments, the orientation of a generic object may be calculated by subtracting a coordinate position of the front of the object from a coordinate position of the center of mass of the object. In some embodiments, the orientation of the object may be defined as the new direction of forward motion of the object, which may be calculated using a physics engine that receives environmental and control inputs and generates a resulting forward motion. For example, in the case of the aircraft, environmental inputs (e.g., wind direction, wind speed, aircraft mass) and control inputs (e.g., wing loading, aileron controls, wing flaps) can be considered by physics engine in order to generate a forward motion of the aircraft.

Although changing the orientation 124 of the object 102 can create visually appealing image sequences, it also introduces an element of physical impossibility to the scene. This physical impossibility becomes problematic when the algorithms that generate the effect 106 are used. Because the effect 106 depends primarily on the motion path 110 and not on the orientation 124 of the object 102, the effect is still generated as though the orientation 124 was aligned with the motion path 110. In the example of FIG. 1B, the effect 106 of the contrail is still generated parallel to the motion path 110 behind the aircraft. From the point of view of the virtual camera 104, this would visually appear physically inconsistent.

Prior to this disclosure, the only way to solve the physical inconsistency between the effect 106 and the new orientation 124 of the object 102 was to send the scene back to the layout or animation step of the scene-generation process and manually redo the work, correcting for the new orientation 124 of the object 102. Another solution relied on an effects artist compensating for the new orientation 124 by adding counter effects. In the example of contrails on an aircraft, this would include adding a simulated fake wind "blowing" at the simulation from the left direction in order to blow the contrail behind the new orientation 124 of the aircraft. All of these solutions were very manually intensive and involved numerous rounds of trial and error to obtain acceptable result that looked physically and visually consistent.

The embodiments described herein solve the problem of generating visually and physically consistent animation effects by generating a new motion path for the object 102 that is based on the new orientation 124. A new flight path can be generated incrementally based on the speed of the object 102 and the orientation 124 of the object in each frame. An offset can be calculated between the new motion path and the existing motion path 110. This offset can then be added to other motion paths in the 3-D virtual scene, including the motion path 108 of the virtual camera 104. Instead of following the original motion paths (108, 110), the objects in the scene and the virtual camera 104 can follow the new motion paths. Because the new motion path aligns with the orientation 124 of the object 102, any effects 106 generated that rely on physics algorithms will be visually consistent with the orientation and motion path of the object from the point of view of the virtual camera 104.

Figure 1C:
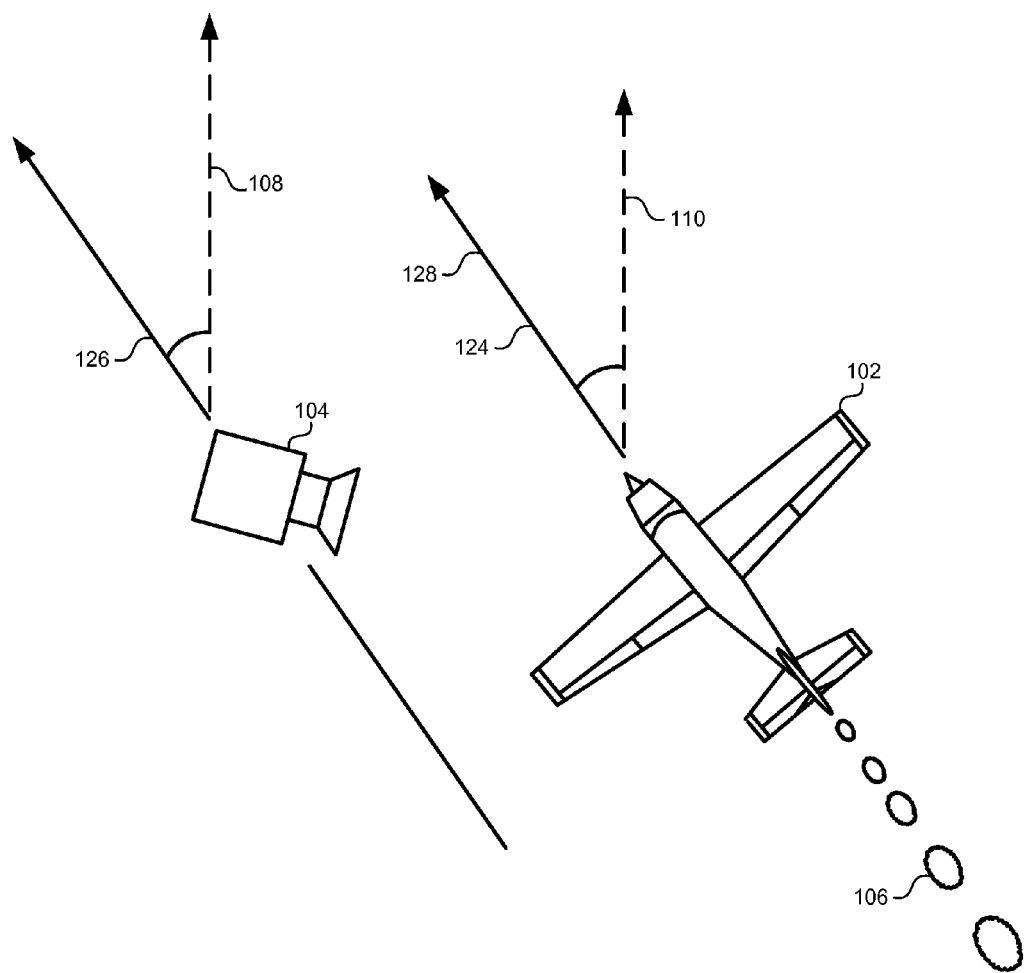
FIG. 1C illustrates the object traveling along a new motion path that aligns with the object orientation, according to some embodiments.

FIG. 1C illustrates the object 102 traveling along a new motion path that aligns with the adjusted object orientation 124, according to some embodiments. Instead of traveling along the old motion path 110, the object 102 travels along a new motion path 128 that is calculated based on the orientation 124 and speed of the object 102. When the effect 106 is now generated, it will appear to be physically consistent with the orientation 124 of the object 102 because the new motion path 128 and the orientation 124 of the object 102 are aligned.

Changing the motion path of the object 102 to align with its orientation 124 will correct the appearance of the effect 106. However, the new motion path 128 alone will send the object 102 through the 3-D virtual scene in a new, unintended direction that could leave the virtual camera 104 behind. Therefore, as the new motion path 128 is calculated, an offset can also be calculated between the new motion path 128 and the old motion path 110. This offset can be calculated by subtracting the coordinate position of the object 102 as it follows the new motion path 128 in each frame from the coordinate position that the object 102 would have followed along the old motion path 110 in the same frame. This offset value can then be applied to other positions and motion paths of objects in the scene, including the virtual camera 104. By applying the same offset to the virtual camera 104, the virtual camera 104 will follow along with the object 102 as originally intended, while capturing the perspective of the object 102 according to the new orientation 124. Consequently, the appearance of the effect 106 will also appear visually and physically consistent from the point of view of the virtual camera 104.

Figure 2:
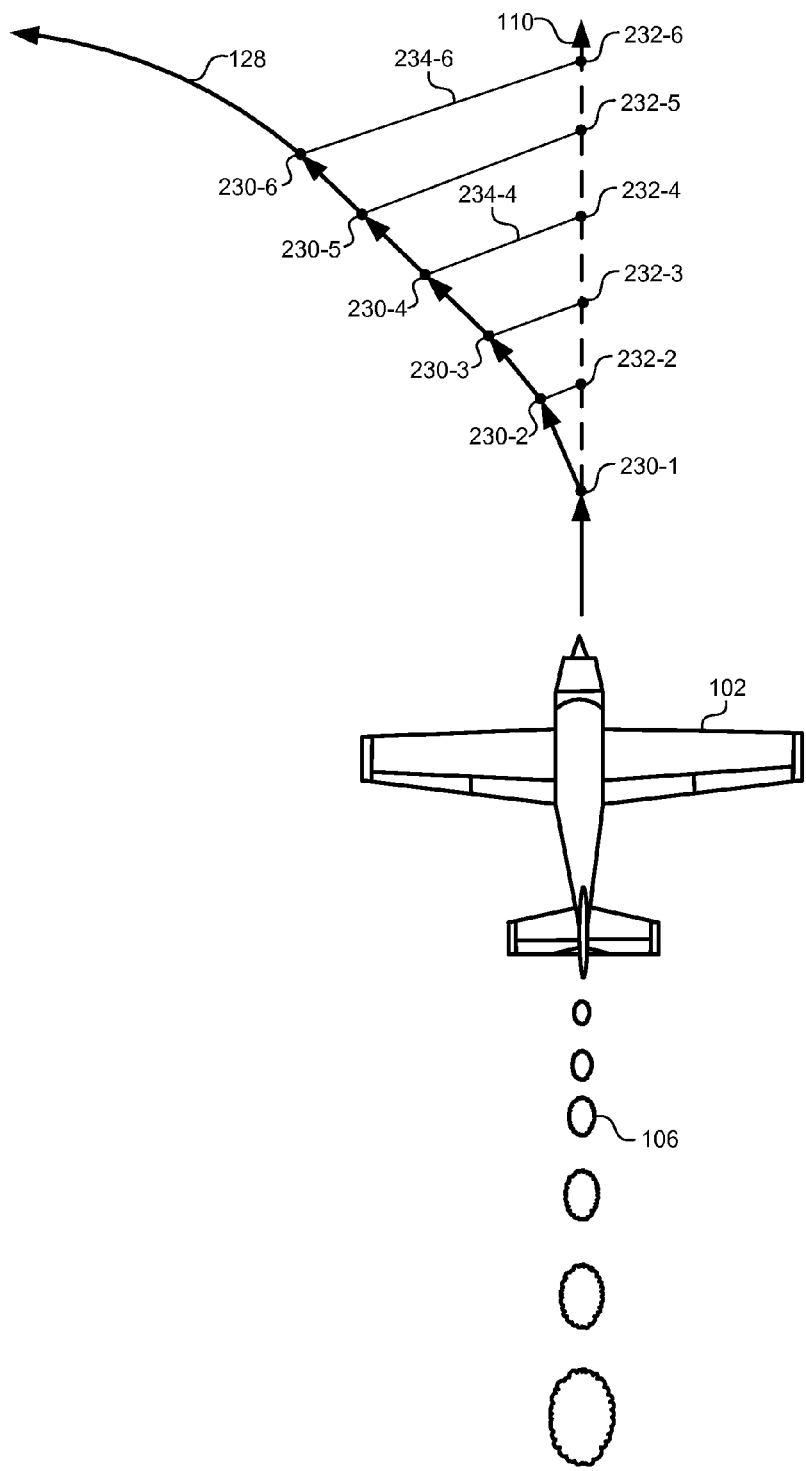
FIG. 2 illustrates how a motion path can be altered to be aligned with a modified object orientation, according to some embodiments.

FIG. 2 illustrates how an old motion path 110 can be altered to be aligned with a modified object orientation, according to some embodiments. A new motion path 128 can be generated incrementally on a frame-by-frame basis. FIG. 2 illustrates points in time along the new motion path 128 and the old motion path 110 that correspond to the same perspective frames in an animation sequence. In the first frame taken at 230-1, the position of the object 102 along the old motion path 110 may be the same as the position of the object 102 along the new motion path 128. However, at point 230-1, the orientation of the object 102 may begin to change such that it is no longer aligned with the original motion path 110. Based on the speed of the object 102 at point 230-1 and the changed orientation of the object 102, a point 230-2 that differs from a corresponding point 232-2 on the old motion path 110 can be generated to begin forming the new motion path 128.

The speed of the object 102 can be calculated in a number of different ways. In some embodiments, the speed can be user-defined. For example, an animator may define the old motion path 110 and provide a speed profile for the object 102, such as a constant 10 mph in the coordinate system of the 3-D virtual scene. In other embodiments, the speed may be calculated based on a frame rate and a distance traveled by the object between successive frames. The frame rate can be inverted to calculate a time between each frame (e.g., 30 frames per second is equivalent to 33 ms between each frame). The distance traveled can be determined by subtracting the coordinate position of the object 102 in a previous frame from the coordinate position of the object 102 in the current frame in the 3-D virtual scene coordinate system. The distance traveled and the time between frames can then be used to calculate the speed of the object. In other embodiments, the speed of the object can be averaged over a window of successive frames in order to smooth the speed result. For example, the speed of the object can be calculated between four successive frames as described above. The sliding window of four frames prior to the current frame can then be averaged to determine the speed of the object in the current frame.

As illustrated by FIG. 2, the orientation of the object 102 continues to veer to the left over time. In each successive frame, the changing orientation of the object 102 will cause a new segment of the new motion path 128 to be created. The point in each successive frame can be determined by calculating the distance travel between the previous frame and the current frame based on the calculated speed of the object 102 and the orientation of the object in the previous frame. An offset 234 can also be calculated between each point in the new motion path and a corresponding point in the old motion path. That offset can be applied to the position and/or motion paths of other objects in the 3-D virtual scene as well as that of the virtual camera. For example, in frame 6 of FIG. 2, the offset 234-6 would be calculated as the coordinate difference between point 230-6 and point 232-6. The offset 234-6 could then be applied to the position of each of the other objects in the 3-D virtual scene.

Figure 3A:
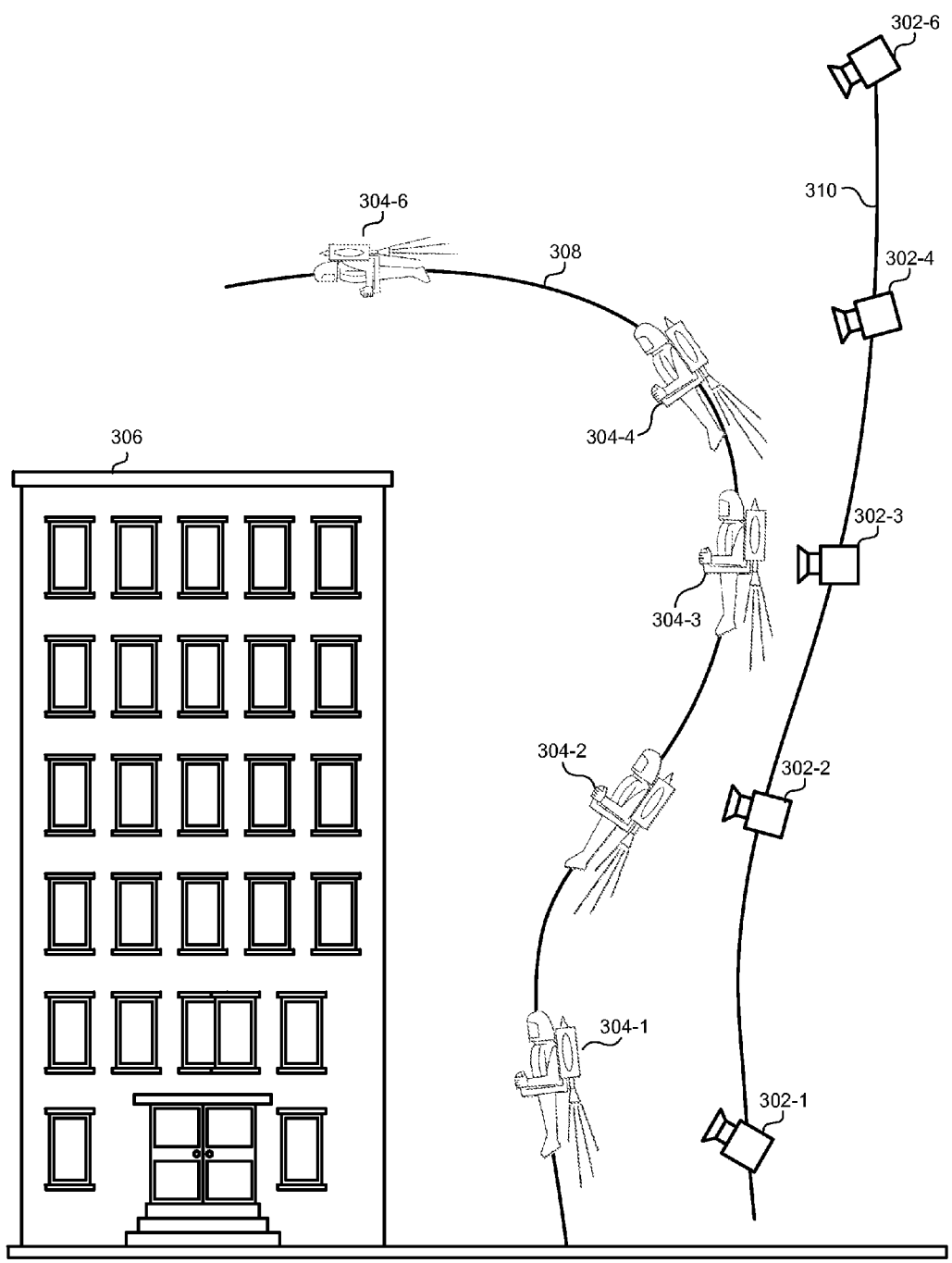
FIG. 3A illustrates an example of an unaltered motion path for an character flying through a virtual scene, according to some embodiments.

FIG. 3A illustrates an example of an unaltered motion path for an character flying through a virtual scene, according to some embodiments. The example of FIG. 3A offers a slightly more complex motion path and relative camera position/orientation compared to that of FIG. 1C. in this example, a character 304 flies along a winding motion path 308 over a building 306 in the scene. The virtual camera 302 follows the flight of the character 304 along its own motion path 310 that is not necessarily parallel to or congruent with the motion path 308 of the character 304. A digital effect is generated based on the motion path 308 of the character 304. Specifically, an output from the jet pack of the character 304 is generated that should be emitted in a downward direction relative to the orientation of the character 304.

Figure 3B:
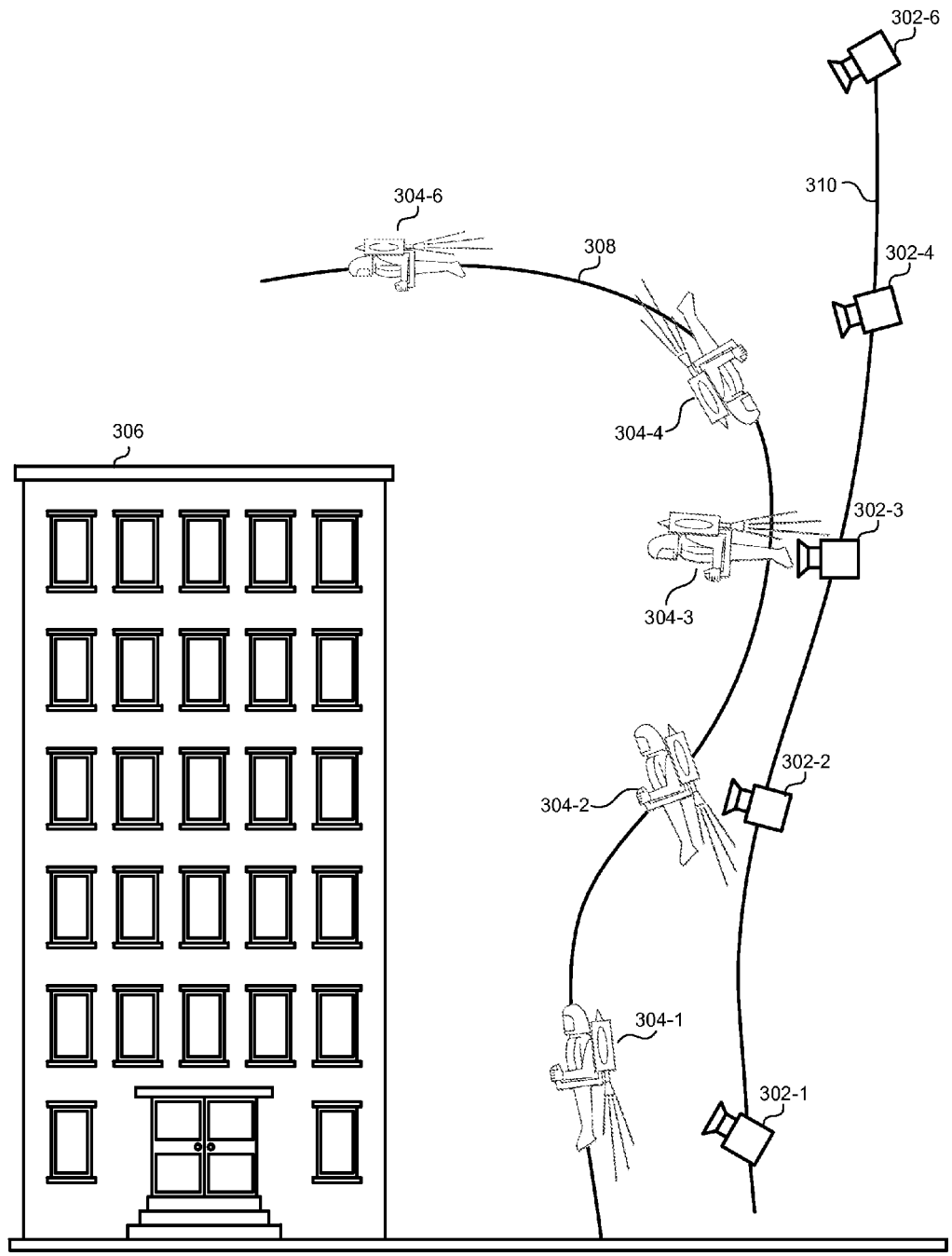
FIG. 3B illustrates an example of altering the orientation of the object relative to the virtual camera in order to achieve a desired look, according to some embodiments.

FIG. 3B illustrates an example of altering the orientation of the character 304 relative to the virtual camera 302 in order to achieve a desired look, according to some embodiments. As described above, a scene director may decide that the visual appeal of the scene can be enhanced by having the virtual camera 302 appear to rotate around the character 304 as the character flies through the scene by changing the orientation of the character 304. Consequently, the orientation of the character 304 relative to the virtual camera 302 can be rotated as shown in FIG. 3B. At this point, the flight path 308 has not changed even though the orientation of the character 304 has changed. Therefore, the visual effect of the output of the jet pack would become distorted and tend to follow along with the motion path 308 instead of maintaining a downward direction relative to the character 304 as shown in FIG. 3B. FIG. 3B illustrates how the character should look according to the director, but not how it would actually be rendered without employing the embodiments described herein for generating a new corrected motion path.

Figure 3C:
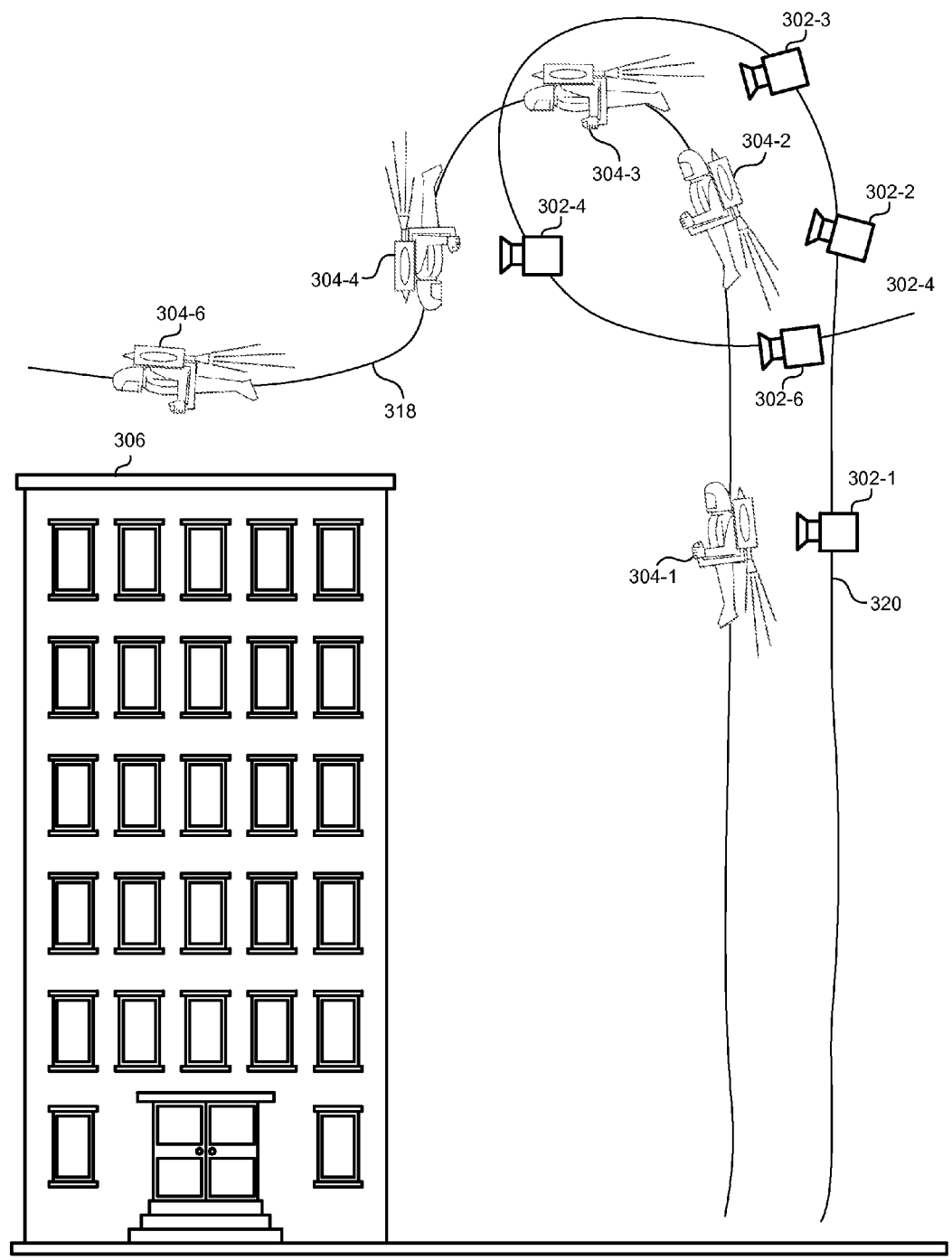
FIG. 3C illustrates an example of an altered flight path for the character and the altered flight path of the virtual camera to maintain the modified orientation of the character relative to the virtual camera, according to some embodiments.

FIG. 3C illustrates an example of an altered flight path 318 for the character and the altered flight path 320 of the virtual camera to maintain the modified orientation of the character relative to the virtual camera, according to some embodiments. Using the method described above, a new motion path 318 can be incrementally generated based on the direction and speed of the character 304. Note that the new motion path 318 is approximately aligned with the direction the character in each frame. In this example, the "direction" of the character is defined as the vector pointing from the center of mass of the character upwards through the top of the head of the character. Also note that the orientation of the character in FIG. 3C is exactly as defined by the scene director in FIG. 3B.

After calculating the new motion path 318, a vector of offset values can be calculated between corresponding character 304 positions in the new motion path 318 and the old motion path 308. These offsets can be applied to other objects in the scene, including the virtual camera 302, to generate new positions and/or motion paths for those objects. Note that in FIG. 3C, the orientation of the virtual camera 302 is maintained at each point as defined in FIG. 3B. However, the position defined by the new motion path 320 of the virtual camera 302 changes the location of the virtual camera 302 to track the character 304 along its new motion path 318. The frame captured at each point (302-1, 302-2, 302-3, 302-4, 302-6) along the new motion paths 318, 320 in FIG. 3C will look the same as the frames captured at the same points in FIG. 3B except that the visual effect comprising the output of the jet pack will be properly generated in FIG. 3C.

The building 306 has been left in FIG. 3C merely as a reference to show how the altered flightpath 320 of the virtual camera and the new motion path 318 relate to the original paths. In an actual implementation, the building 306 and other scene elements can be dealt with in one of two ways. In one embodiment, the offsets can be applied to the building 306 and other scene elements in the same way that they are applied to the motion path of the virtual camera, and the entire scene to be rendered using the altered camera path 320. In another embodiment, the building 306 and other scene elements can be left "as is" and rendered with the original camera path 310. When the frames of the building 306 and other scene elements generated from the original camera path 310 are combined with the character 304 and smoke trail in the frames generated from the altar camera path 320 the camera views will match.

Figure 4:
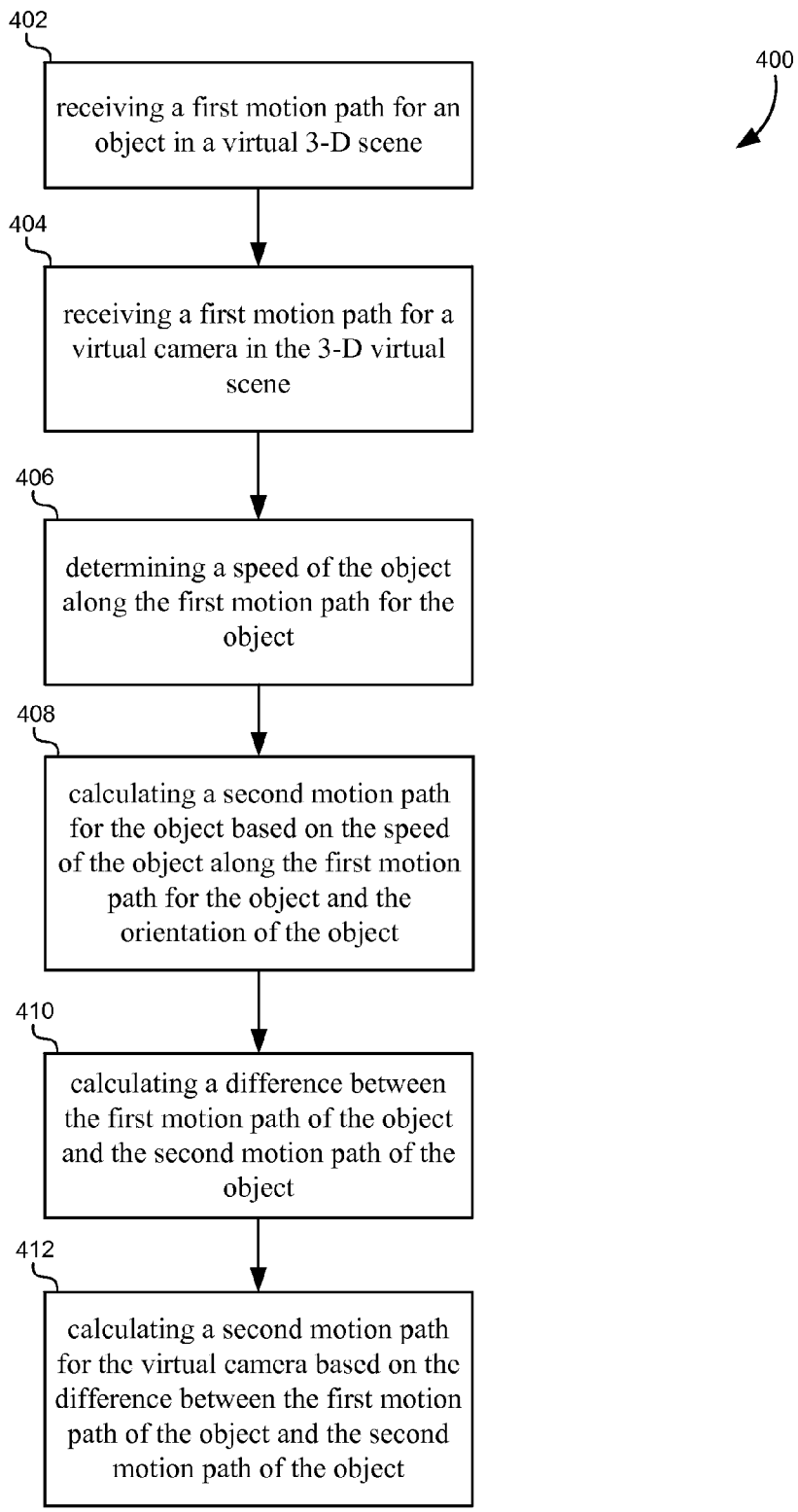
FIG. 4 illustrates a flowchart of a method for generating new motion path information in response to modifying the orientation of an object relative to a virtual camera, according to some embodiments.

FIG. 4 illustrates a flowchart 400 of a method for generating new motion path information in response to modifying the orientation of an object relative to a virtual camera, according to some embodiments. The method may include receiving a first motion path for an object in a virtual 3-D scene (402). The orientation of the object may not be aligned with the first motion path for the object for at least a portion of the first motion path. In other words, as described above, the object may be pointed in a different direction than the direction of travel according to the first motion path. The motion path may include a direction of motion for the object along with a speed of motion for the object. The speed of the object between successive frames may be calculated based on position differences between frames and/or may be user-defined.

The method may also include receiving a first motion path for a virtual camera in the 3-D virtual scene (404). In some cases, the motion path of the virtual camera may generally follow the motion path of the object, but this is not required. In some embodiments, the virtual camera may be oriented towards the object as the virtual camera travels down the first motion path for the virtual camera. In other words, the camera may be constantly aimed at the object, but this is also not required.

The method may additionally include determining a speed of the object along the first motion path for the object (406). The speed of the object between successive frames may be calculated based on position differences between frames and the frame rate, or may be user-defined as described above. The speed may also be averaged over a sliding window of consecutive frames. The method may further include calculating a second motion path for the object based on the speed of the object and the orientation of the object (408). In some embodiments, a visual effect may be received for the object that is generated based on the motion direction of the object rather than the orientation. The visual effect may be visibly incorrect when the motion direction of the object is according to the first motion path, but may be visibly correct when the motion of the object is according to the second motion path.

The method may also include calculating a difference between the first motion path of the object and the second motion path of the object (410). This difference may also be referred to as an offset, and may be calculated by determining the difference between coordinate positions of the object according to the second motion path and coordinate positions of the object according to the first motion path. The method may additionally include calculating a second motion path for the virtual camera based on the difference between the first motion path of the object and the second motion path of the object. In some embodiments, the second motion path for the virtual camera can be calculated such that the virtual camera is oriented towards the object as the virtual camera travels down its second motion path. In some embodiments, the second motion path may preserve a camera orientation that existed in its first motion path with only the position being altered according the second motion path.

In some embodiments, the method may also receive additional objects for the 3-D virtual scene, and the position offset calculated above can also be applied to each of the objects in each of the frames of the 3-D virtual scene. A series of images can be rendered for the first object traveling along its second motion path from the perspective of the virtual camera traveling along the virtual camera's second motion path. This set of images can be displayed in an animated sequence on a display device. For illustrative purposes only, exemplary pseudocode for carrying out the method of flowchart 400 is displayed below. This psuedocode may be particularly useful for the airplane object of FIGS. 1A-1C above.

Exemplary Psuedocode

```
function generate_new_motion_paths(object)
    # Initialization: new motion path starts at the
    # same place as the object
    corrected_object.position(time := firstframe) :=
    object.position(time := firstframe)
    offset(time:=firstframe) = (0,0,0)
    # ITERATIVELY BUILD NEW MOTION PATH
    # Loop over all frames in the sequence
    # start from firstframe+1 since firstframe has
    # already been set above.
    for frame in range(firstframe+1, lastframe):
        # First compute speed
        speed = compute_speed(object, frame)
        # Next compute forward direction
        direction = compute_forward_direction(object, frame, speed)
        # Advence the previous position by speed*direction
        # and store in the corrected_object
        corrected_object.position(time:=frame) :=
        corrected_object.position(time:=frame-1) + speed *
        direction
        # Store the offset
        offset.position(time:=frame) :=
        corrected_object.position(time:=frame) -
        object.position(time:=frame)
    end loop
    # APPLY THE OFFSET
    for objects in scene:
        add offset to objects.position(all_frames)
end function
function compute_speed(object, frame)
    if speed_option == user_defined then
        speed := user_defined_speed
    else if speed_option == calculated_speed then
        speed := object.position(frame) - object.position(frame-1)
    else if speed_option == average_speed then
        speed := (compute_speed(object, frame) +
        compute_speed(object, frame-1) +
        compute_speed(object, frame-2) +
        compute_speed(object, frame-3))/4
end function
function compute_forward_direction(object, frame, speed)
    if direction_option == calculate then
        direction = object.front_of_plane - object.center_of_plane
    else if direction_option == model then
        # apply a flight model using momentum, wing loading,
        # G-forces, lift/drag, etc.
        direction = apply_flight_model( )
    else if direction_option == control then
        # take the object's motion and apply it back to
        # any control surfaces.
        direction = apply_motion_to_control_surfaces( )
end function
```

Figure 5:
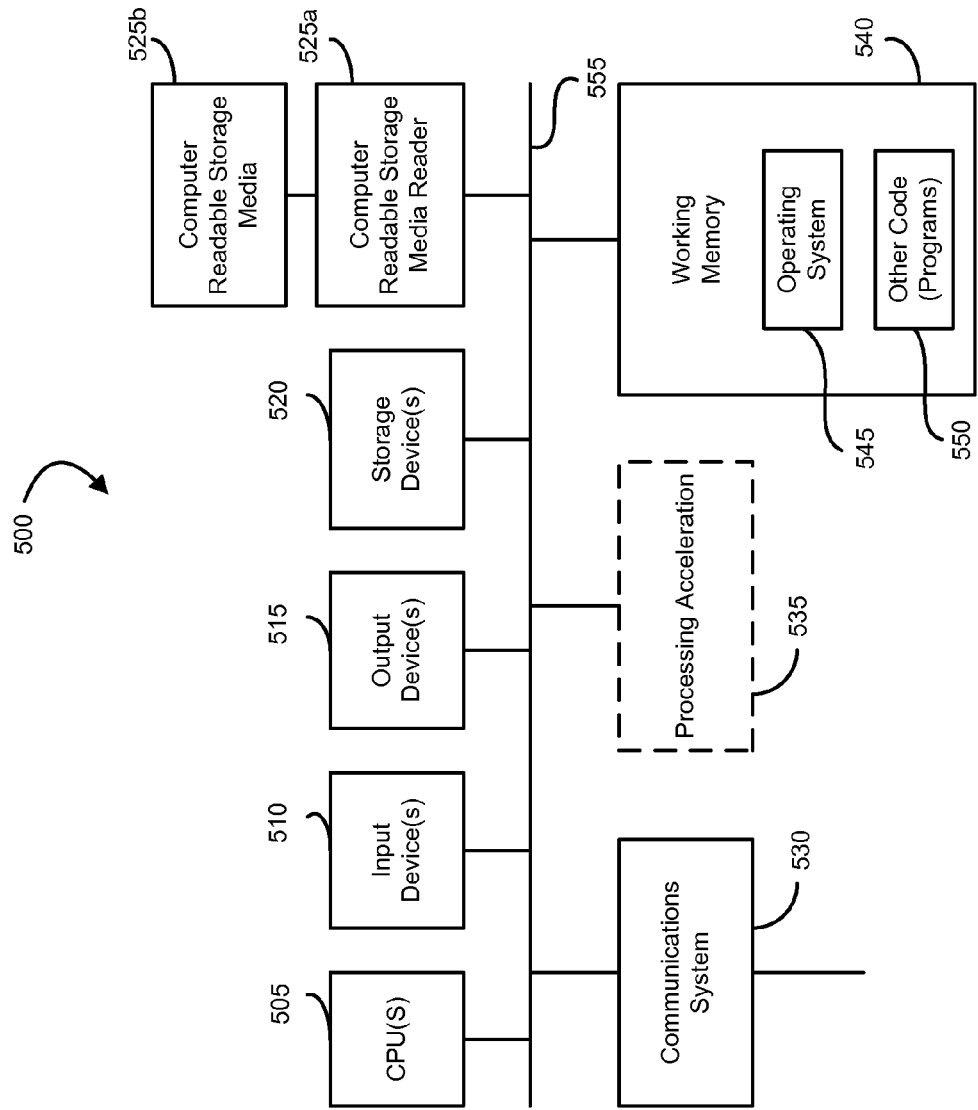
FIG. 5 illustrates a block diagram of an exemplary computer system in which embodiments may be implemented.

Each of the embodiments disclosed herein may be implemented in a special-purpose or a general-purpose computer system. FIG. 5 illustrates an exemplary computer system 500, in which parts of various embodiments of the present invention may be implemented. The system 500 may be used to implement any of the computer systems described above. The computer system 500 is shown comprising hardware elements that may be electrically coupled via a bus 555. The hardware elements may include one or more central processing units (CPUs) 505, one or more input devices 510 (e.g., a mouse, a keyboard, etc.), and one or more output devices 515 (e.g., a display device, a printer, etc.). The computer system 500 may also include one or more storage device 520. By way of example, storage device(s) 520 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 525a, a communications system 530 (e.g., a modem, a network card (wireless or wired), an infra-red communication device, etc.), and working memory 540, which may include RAM and ROM devices as described above. In some embodiments, the computer system 500 may also include a processing acceleration unit 535, which can include a DSP, a special-purpose processor, a Graphic Processing Unit (GPU), and/or the like.

The computer-readable storage media reader 525a can further be connected to a computer-readable storage medium 525b, together (and, optionally, in combination with storage device(s) 520) comprehensively representing remote, local, fixed, and/or removable storage devices plus storage media for temporarily and/or more permanently containing computer-readable information. The communications system 530 may permit data to be exchanged with the network 520 and/or any other computer described above with respect to the system 500.

The computer system 500 may also comprise software elements, shown as being currently located within a working memory 540, including an operating system 545 and/or other code 550, such as an application program (which may be a client application, web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed. Software of computer system 500 may include code 550 for implementing embodiments of the present invention as described herein.

Each of the methods described herein may be implemented by a computer system, such as computer system 500 in FIG. 5. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computer without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method comprising:
   receiving a first motion path for an object in a virtual 3-D scene, wherein an orientation of the object is not aligned with the first motion path for the object for at least a portion of the first motion path for the object;
   receiving a first motion path for a virtual camera in the 3-D virtual scene;
   determining a speed of the object along the first motion path for the object;
   calculating a second motion path for the object based on the speed of the object along the first motion path for the object and the orientation of the object, wherein the second motion path of the object is aligned with second motion path;
   calculating a difference between the first motion path of the object and the second motion path of the object;
   calculating a second motion path for the virtual camera based on the difference between the first motion path of the object and the second motion path of the object;
   rendering a series of images of the object moving along the second motion path for the object using the virtual camera moving along the second motion path of the virtual camera; and
   causing the series of images to be displayed in an animated sequence on a display device.

2. The method of claim 1, wherein the virtual camera is oriented towards the object as the virtual camera travels down the first motion path for the virtual camera; and
   the second motion path for the virtual camera is calculated such that the virtual camera is oriented towards the object as the virtual camera travels down the second motion path for the virtual camera.

3. The method of claim 1, further comprising receiving a visual effect for the object, wherein the visual effect is generated based on a motion direction of the object, wherein:
   the visual effect is visibly incorrect when the motion direction of the object is according to the first motion path for the object; and
   the visual effect is visibly correct when the motion direction of the object is according to the second motion path for the object.

4. The method of claim 1, wherein the first motion path comprises:
   a direction of motion for the object; and
   a speed of motion for the object.

5. The method of claim 1, wherein determining the speed of the object along the first motion path for the object comprises:
dividing virtual motion of the object according to the first motion path for the object into a sequence of time frames; and
calculating a difference in position of the object in adjacent time frames.

6. The method of claim 5, wherein determining the speed of the object along the first motion path for the object further comprises calculating an average of the differences in position of the object in each of the adjacent time frames.

7. The method of claim 1, wherein determining the speed of the object along the first motion path for the object comprises receiving a user-defined speed for the object.

8. The method of claim 1, wherein the virtual 3-D scene comprises additional objects, and the method further comprises changing the position of the additional objects based on the difference between the first motion path of the object and the second motion path of the object.

9. A system comprising:
one or more processors; and
one or more memory devices having instructions stored thereon that, when executed by the one or more processors, cause the one or more processors to perform operations comprising:
receiving a first motion path for an object in a virtual 3-D scene, wherein an orientation of the object is not aligned with the first motion path for the object for at least a portion of the first motion path for the object;
receiving a first motion path for a virtual camera in the 3-D virtual scene;
determining a speed of the object along the first motion path for the object;
calculating a second motion path for the object based on the speed of the object along the first motion path for the object and the orientation of the object, wherein the second motion path of the object is aligned with second motion path;
calculating a difference between the first motion path of the object and the second motion path of the object;
calculating a second motion path for the virtual camera based on the difference between the first motion path of the object and the second motion path of the object;
rendering a series of images of the object moving along the second motion path for the object using the virtual camera moving along the second motion path of the virtual camera; and
causing the series of images to be displayed in an animated sequence on a display device.

10. The system of claim 9, wherein the instructions, when executed by the one or more processors, cause the one or more processors to perform additional operations comprising receiving a visual effect for the object, wherein the visual effect is generated based on a motion direction of the object, wherein:
the visual effect is visibly incorrect when the motion direction of the object is according to the first motion path for the object; and
the visual effect is visibly correct when the motion direction of the object is according to the second motion path for the object.

11. The system of claim 9, wherein the first motion path comprises:
a direction of motion for the object; and a speed of motion for the object.

12. The system of claim 9, wherein determining the speed of the object along the first motion path for the object comprises:
dividing virtual motion of the object according to the first motion path for the object into a sequence of time frames; and
calculating a difference in position of the object in adjacent time frames.

13. The system of claim 12, wherein determining the speed of the object along the first motion path for the object further comprises calculating an average of the differences in position of the object in each of the adjacent time frames.

14. A non-transitory computer-readable medium comprising instructions that, when executed by one or more processors, cause the one or more processors to perform operations comprising:
receiving a first motion path for an object in a virtual 3-D scene, wherein an orientation of the object is not aligned with the first motion path for the object for at least a portion of the first motion path for the object;
receiving a first motion path for a virtual camera in the 3-D virtual scene;
determining a speed of the object along the first motion path for the object;
calculating a second motion path for the object based on the speed of the object along the first motion path for the object and the orientation of the object, wherein the second motion path of the object is aligned with second motion path;
calculating a difference between the first motion path of the object and the second motion path of the object;
calculating a second motion path for the virtual camera based on the difference between the first motion path of the object and the second motion path of the object;
rendering a series of images of the object moving along the second motion path for the object using the virtual camera moving along the second motion path of the virtual camera; and
causing the series of images to be displayed in an animated sequence on a display device.

15. The non-transitory computer-readable medium of claim 14, wherein the instructions, when executed by the one or more processors, cause the one or more processors to perform additional operations comprising receiving a visual effect for the object, wherein
the visual effect is generated based on a motion direction of the object, wherein:
the visual effect is visibly incorrect when the motion direction of the object is according to the first motion path for the object; and
the visual effect is visibly correct when the motion direction of the object is according to the second motion path for the object.

16. The non-transitory computer-readable medium of claim 14, wherein the first motion path comprises:
direction of motion for the object; and a speed of motion for the object.

17. The non-transitory computer-readable medium of claim 14, wherein determining the speed of the object along the first motion path for the object comprises:
dividing virtual motion of the object according to the first motion path for the object into a sequence of time frames; and
calculating a difference in position of the object in adjacent time frames.

* * * * *

UNITED STATES PATENT AND TRADEMARK OFFICE
CERTIFICATE OF CORRECTION

PATENT NO. : 9,684,993 B2  
APPLICATION NO. : 14/862512  
DATED : June 20, 2017  
INVENTOR(S) : David Weitzberg Page 1 of 1

It is certified that error appears in the above-identified patent and that said Letters Patent is hereby corrected as shown below:

On the Title Page

Item (71), subsection Applicant:  
Replace "LUCASFILM ENTERTAINMENT COMPANY, LTD., San Francisco, CA (US)" with --LUCASFILM ENTERTAINMENT COMPANY LTD., San Francisco, CA (US)--

In the Claims

Column 14, Claim 16, Line 56:  
Replace "direction of motion for the object; and a speed of motion" with --a direction of motion for the object; and a speed of motion--

Signed and Sealed this  
Thirtieth Day of January, 2018

Joseph Matal  
*Performing the Functions and Duties of the*  
*Under Secretary of Commerce for Intellectual Property and*  
*Director of the United States Patent and Trademark Office*